United States Patent
Deschaine et al.

(10) Patent No.: US 6,198,720 B1
(45) Date of Patent: *Mar. 6, 2001

(54) DISTRIBUTED DIGITAL CROSS-CONNECT SYSTEM AND METHOD

(75) Inventors: Stephen A. Deschaine, Garland; Mark C. Cromwell, Plano; Gregory S. Lovelace, Sachse; Becky J. Sampson, Garland; Michael H. Jette, Grapevine; Dennis K. Smith, Colleyville; William A. Moffit, Rowlett; Steven D. Sensel, Blue Ridge; Edgar L. Read; Amanda G. Noe, both of Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/774,155

(22) Filed: Dec. 26, 1996

(51) Int. Cl.[7] .................................................. H04L 12/64
(52) U.S. Cl. ............................................................ 370/220
(58) Field of Search .................................. 370/220, 228, 370/216, 217, 218, 219, 221, 227, 386, 509, 508, 503, 507, 510, 522, 357, 360, 369, 376, 225, 389, 351, 352, 400, 401; 340/827, 825.03, 825.01; 379/221; 359/117, 110, 152, 164, 173, 139, 147, 109, 118; 375/354–357

(56) References Cited

U.S. PATENT DOCUMENTS

| | | | |
|---|---|---|---|
| 4,301,534 | 11/1981 | Genter | 370/105 |
| 4,355,384 | 10/1982 | Genter et al. | 370/64 |
| 4,701,907 | 10/1987 | Collins | 370/63 |
| 4,709,418 | 11/1987 | Fox et al. | 455/612 |
| 4,771,420 | 9/1988 | Deschaine et al. | 370/68 |
| 4,797,589 | 1/1989 | Collins | 370/63 |
| 4,825,433 | 4/1989 | Deschaine | 370/62 |
| 4,901,308 | 2/1990 | Deschaine | 270/58.1 |
| 5,027,375 | 6/1991 | Ernst | 375/107 |
| 5,069,521 | * 12/1991 | Hardwick | 370/228 |
| 5,189,410 | * 2/1993 | Kosugi et al. | 370/248 |
| 5,291,489 | 3/1994 | Morgan et al. | 370/85.1 |
| 5,313,456 | * 5/1994 | Sugawara | 370/228 |
| 5,436,890 | 7/1995 | Read et al. | 370/58.2 |
| 5,523,870 | 6/1996 | Suzuki et al. | 359/139 |
| 5,526,359 | 6/1996 | Read et al. | 370/100.1 |
| 5,594,581 | 1/1997 | Alphonsus | 359/177 |
| 5,901,136 | * 5/1999 | Lovelace et al. | 370/217 |
| 5,956,324 | * 4/1999 | Engdahl et al. | 370/242 |

FOREIGN PATENT DOCUMENTS

| | | | |
|---|---|---|---|
| 2265278 | 9/1993 | (GB) | H04Q/7/04 |
| 9534130 | 12/1995 | (WO) | H03G/11/04 |

* cited by examiner

Primary Examiner—Dang Ton
(74) Attorney, Agent, or Firm—Baker Botts L.L.P.

(57) ABSTRACT

A distributed digital cross-connect system (10) is provided. The system includes two or more network interface islands (12) that connect to the telecommunications network. The system (10) also includes one or more distributed services nodes (18). Each distributed services node (18) connects to two or more of the network interface islands (12). The network interface islands (12) can transmit data to each other through the distributed services node (18). An administration system (14) is also connected to each distributed services node (18) and each network interface island (12). The administration system (14) transmits matrix configuration and telecommunications channel routing data to the network interface islands (12) and the distributed services nodes (18).

2 Claims, 12 Drawing Sheets

DATA RATE IS 125 μS/24 CHANNELS/21 BIT TIMES=248 nS PER BIT TIME OR 4.032 MHz DATA RATE

FIG. 8D

| | 156 | | | | | | 159 | |
|---|---|---|---|---|---|---|---|---|
| FRAME 1 | DATA | 0 | F/D | TCI | P | I1 | DATA, F | P' |
| FRAME 2 | DATA | 0 | F/D | TCI | P | I2 | DATA, F | TCI |
| FRAME 3 | DATA | 0 | F/D | TCI | P | I3 | DATA, F | P' |
| FRAME 4 | DATA | 0 | F/D | TCI | P | I4 | DATA, F | I' 1 |
| FRAME 5 | DATA | 0 | F/D | TCI | P | I5 | DATA, F | P' |
| FRAME 6 | DATA | A | F/D | TCI | P | I6 | DATA, F | A |
| FRAME 7 | DATA | 0 | F/D | TCI | P | I7 | DATA, F | P' |
| FRAME 8 | DATA | 0 | F/D | TCI | P | I8 | DATA, F | TCI |
| FRAME 9 | DATA | 0 | F/D | TCI | P | I9 | DATA, F | P' |
| FRAME 10 | DATA | 0 | F/D | TCI | P | I10 | DATA, F | I' 2 |
| FRAME 11 | DATA | 0 | F/D | TCI | P | I11 | DATA, F | P' |
| FRAME 12 | DATA | B | F/D | TCI | P | I12 | DATA, F | B |
| FRAME 13 | DATA | 0 | F/D | TCI | P | I13 | DATA, F | P' |
| FRAME 14 | DATA | 0 | F/D | TCI | P | I14 | DATA, F | TCI |
| FRAME 15 | DATA | 0 | F/D | TCI | P | I15 | DATA, F | P' |
| FRAME 16 | DATA | 0 | F/D | TCI | P | I16 | DATA, F | I' 3 |
| FRAME 17 | DATA | 0 | F/D | TCI | P | I17 | DATA, F | P' |
| FRAME 18 | DATA | C | F/D | TCI | P | I18 | DATA, F | C |
| FRAME 19 | DATA | 0 | F/D | TCI | P | I19 | DATA, F | P' |
| FRAME 20 | DATA | 0 | F/D | TCI | P | I20 | DATA, F | TCI |
| FRAME 21 | DATA | 0 | F/D | TCI | P | I21 | DATA, F | P' |
| FRAME 22 | DATA | 0 | F/D | TCI | P | I22 | DATA, F | I' 4 |
| FRAME 23 | DATA | 0 | F/D | TCI | P | I23 | DATA, F | P' |
| FRAME 24 | DATA | D | F/D | TCI | P | S/0 | DATA, F | D |

8 BITS           9 BITS

13 BITS          10 BITS

DISTRIBUTED DIGITAL CROSS-CONNECT SYSTEM AND METHOD

TECHNICAL FIELD OF THE INVENTION

This invention relates in general to the field of telecommunication systems, and more particularly to a distributed digital cross-connect system and method.

BACKGROUND OF THE INVENTION

Telecommunication systems are operable to connect two or more telecommunications ports through a variety of data transmission media. For example, a first telecommunications port may be coupled to a microwave data transmission medium, which may in turn be coupled to a copper conductor data transmission medium, then to a fiber optic data transmission medium, and subsequently to a second telecommunications port. In this example, telecommunications data is transmitted through a telecommunications channel between the first telecommunications port and the second telecommunications port via the microwave data transmission medium, the copper conductor data transmission medium, and the fiber optic data transmission medium.

Modern telecommunication systems are typically comprised of a large number of telecommunications ports connected to a large number of data transmission media. These media may utilize large signal frequency bandwidths, such that two or more telecommunications channels may be combined for transmission over the data transmission media by multiplexing. In order to connect any given port to any other given port, it is necessary to utilize specialized telecommunication switches, which are used to connect the data transmission media. Such telecommunication switches are capable of connecting any of a large number (M) of input ports to any of a large number (N) of output ports, with a different data transmission medium connected to each input and output port. Furthermore, these switches may be capable of demultiplexing the signal carried over a given media in order to provide switching capability for multiplexed telecommunications channels.

A digital cross-connect system is a specialized telecommunications switch that provides improved flexibility in switching services. An example of a modern digital cross-connect system is provided by U.S. Pat. No. 5,436,890 to Read et al entitled "Integrated Multi-rate Cross-Connect System," assigned to DSC Communications Corporation, issued Jul. 25, 1995 (hereinafter "Read"). In addition to a telecommunications switch operable to connect any of M input ports to any of N output ports, the digital cross-connect system taught in Read contains redundant parallel planes of all components, such that the digital cross-connect system can experience a number of failures in the components that comprise both planes without loss of network traffic.

Despite the additional flexibility inherent in digital cross-connect systems, connection of data transmission media to the digital cross-connect system input ports and output ports must be coordinated in order to optimize telecommunications traffic flow. For example, it may be desirable to transmit telecommunications traffic from an input port of a first digital cross-connect system to an output port of a second digital cross-connect system. While this connection may be accomplished by providing connections between an output port of the first digital cross-connect system and an input port of the second digital cross-connect system, such connections consume digital cross-connect system resources, i.e., input ports and output ports.

Furthermore, if two or more separate and discrete digital cross-connect systems are being used to route telecommunications traffic, a significant amount of digital cross-connect system resources must be used to interconnect the digital cross-connect systems. In many cases, it is desirable to use two or more physically separated digital cross connects, such as when a small number of telephony circuits are connected to network interfaces, but to later increase the number of digital cross connects and, subsequently, the number of connections between digital cross connects, such as when the number of telephony circuits connected to network interfaces has increased. Presently available digital cross connect systems do not readily accommodate such increases in the number of network interfaces, and require network interfaces to be remapped in order to decrease the number of connections which must be made between digital cross connect systems.

SUMMARY OF THE INVENTION

Therefore a need has arisen for a system and method for connecting a digital cross-connect system to network interfaces that readily accommodates increases in the number of network interfaces.

Accordingly, the present invention provides a system and method for connecting a digital cross-connect system to network interfaces that uses network interface islands, and which allows data communications to be transmitted from an input port of any network interface island to an output port of any network interface island.

One aspect of the present invention is a distributed digital cross-connect system. The system includes two or more network interface islands that interface with the telecommunications system. The system also includes one or more distributed services nodes. Each distributed services node connects to two or more network interface islands. The network interface islands transmit data to each other through the distributed services node. An administration system is also connected to each distributed services node and each network interface island. The administration system transmits switch configuration and telecommunications channel routing data to the network interface islands and the distributed services nodes.

The present invention provides several technical advantages. One important technical advantage of the present invention is that two or more discrete network interface islands may be interconnected to a distributed services node that allows any input port of a network interface island to be switched to any output port of a network interface island.

Another important technical advantage of the present invention is that the number of network interface islands may be increased or decreased without affecting the input and output port configurations of each network interface island.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIGS. 8A through 8D are exemplary data formats embodying concepts of the present invention;

DETAILED DESCRIPTION OF THE INVENTION

Preferred embodiments of the present invention are illustrated in the FIGURES, like numerals being used to refer to like and corresponding parts of the various drawings.

Figure 1:
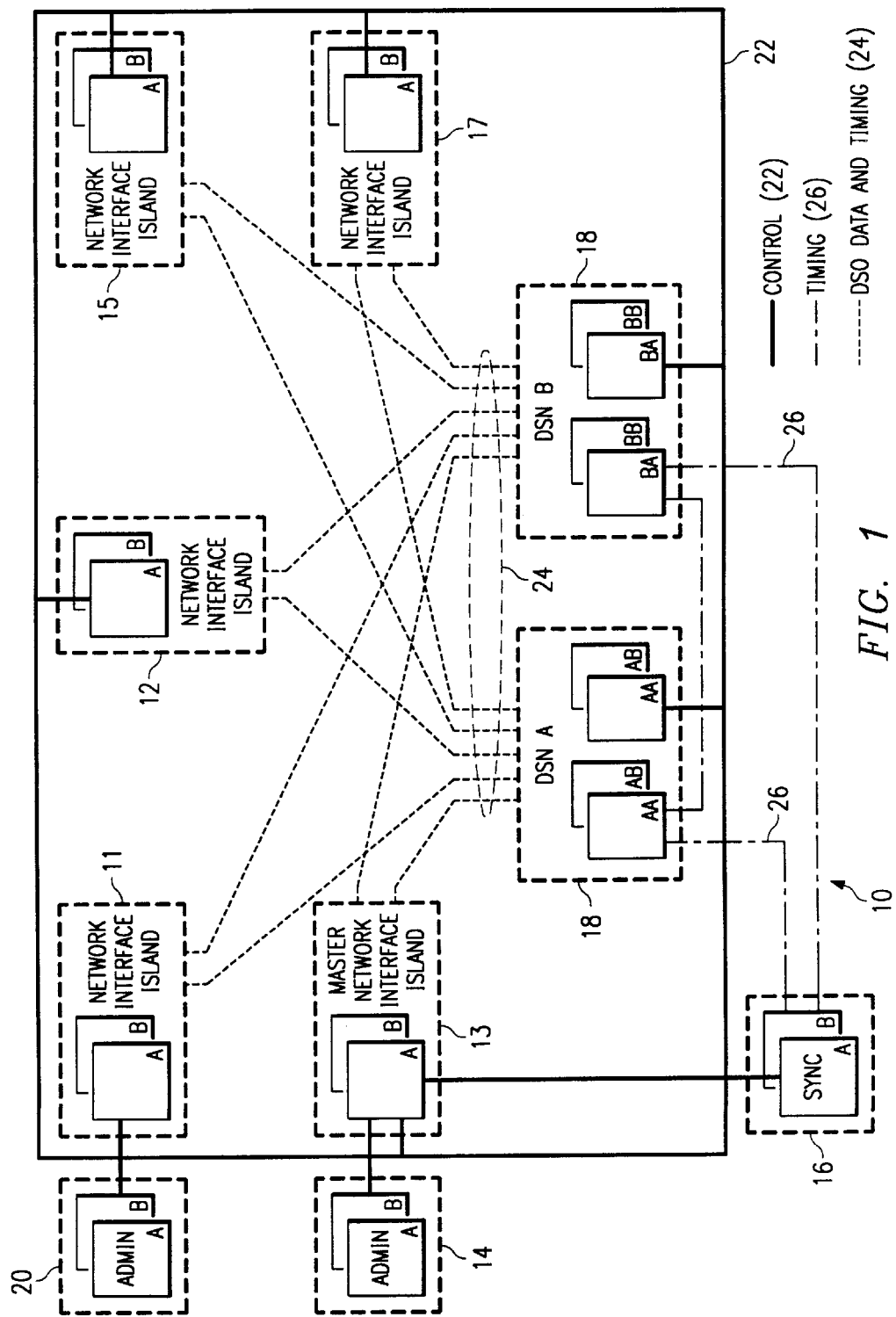
FIG. 1 is a block diagram of an exemplary system architecture of a distributed digital cross-connect system embodying concepts of the present invention.

FIG. 1 is a block diagram of an exemplary system architecture of a distributed digital cross-connect system 10 embodying concepts of the present invention. As shown in FIG. 1, distributed digital cross-connect system 10 includes four network interface islands 11, 12, 15, and 17, a master network interface island 13, an administration subsystem 14, a synchronization subsystem (SYNC) 16, and two distributed services nodes (DSN) 18. Distributed digital cross-connect system 10 also contains provisions for an optional administration subsystem 20. Network interface islands 11, 12, 15, and 17, master network interface island 13, and distributed services nodes 18 are coupled to control system communications media 22. In addition, each network interface island 11, 12, 15, and 17 and master network interface island 13 is coupled to each distributed services node 18 by data and timing media 24. Synchronization subsystem 16 is coupled to distributed services nodes 18 by timing signal media 26.

Network interface islands 11, 12, 15, and 17 and master network interface island 13 comprise M input ports and N output ports, where "M" and "N" may be any suitable numbers. For example, a first network interface island 11 may provide distributed digital cross-connect system 10 with 1096 input ports and 1096 output ports, and a second network interface island 15 may provide digital cross-connect system 10 with 548 input ports and 548 output ports. These network interface islands are used to provide telecommunications network interfaces ports through which telecommunications data transmission channels may be established.

For example, copper conductor data transmission media carrying DS1 level signals may be coupled to the input ports and the output ports of network interface islands 11, 12, 13, 15, and 17. A telecommunications data transmission channel may need to be established between a first telecommunications port coupled to a first data transmission medium that is coupled to an input port of a first network interface island, such as network interface island 11, and a second telecommunications port coupled to a second data transmission medium that is coupled to an output port of a second network interface island, such as network interface island 15. The present invention allows this telecommunications data transmission channel to be established through the distributed services nodes 18 without connecting an output port of network interface island 11 to an input port of network interface island 15.

As shown in FIG. 1, four network interface islands 11, 12, 15, and 17 and master network interface island 13 are coupled to distributed services nodes 18. Many suitable numbers of network interface islands may be connected to distributed services nodes 18. In addition, as shown in FIG. 1, each network interface island may comprise two redundant planes. The use of two redundant planes is similar to the system and method shown in Read. Master network interface island 13 may be identical to network interface islands 11, 12, 15, and 17, and may be the only network interface island coupled directly to administration subsystem 14.

Administration subsystem 14 of distributed digital cross-connect system 10 performs telecommunications routing and database maintenance for distributed digital cross-connect system 10. As previously noted, administration subsystem 14 may be associated with master network interface island 13, such that communication with network interface islands 11, 12, 15, and 17 via control system communications media 22 may require the intermediate step of transmitting the data to master network interface island 13. Administration subsystem 14 may also be distributed such that redundant administration subsystems 14 couple to one or more network interface islands 11, 12, 15, and 17, or may be in a centralized location and directly coupled to each network interface island 11, 12, 15, and 17.

The network connections for each network interface island 11, 12, 15, and 17 are transmitted to administration subsystem 14 over control system communications media 22. Likewise, connections established between input ports of each network interface island 11, 12, 13, 15, and 17 and output ports of other network interface islands 11, 12, 13, 15, and 17 through distributed services node 18 are coordinated by administration subsystem 14. Administration subsystem 14 further performs database maintenance and telecommunications data transmission channel routing functions for distributed digital cross-connect system 10.

Synchronization subsystem 16 is a timing subsystem for coordinating components of distributed digital cross-connect system 10. Synchronization subsystem 16 may be associated with master network interface island 13, in a manner similar to administration subsystem 14. Alternately, synchronization subsystem 16 may be centrally located and couple directly to each subsystem and network interface island in distributed digital cross-connect system 10. Synchronization subsystem 16 is a master timing system that receives network reference timing signals from the network of data transmission media to which it is connected (not explicitly shown). These timing signals are transmitted to the distributed services nodes timing systems (not explicitly shown) associated with distributed services nodes 18. Timing signals are then transmitted to the timing systems of network interface islands 11, 12, 15, and 17 and master network interface island 13 via data and timing media 24.

Distributed services nodes 18 are telecommunications switches having M input nodes and N output nodes, and form a telecommunications data transmission path between network interface islands 11, 12, 15, and 17 and master network interface island 13. Distributed services nodes 18 may include data processing equipment for converting optical signals to electrical signals and for multiplexing and demultiplexing data, and data processing equipment for converting between parallel and serial data formats.

Control system communications media 22, data and timing media 24, and timing signal media 26 are digital data transmission media, such as copper conductors, coaxial conductors, optical conductors, or many other suitable conductors. In the preferred embodiment, control system communications media 22, data and timing media 24, and timing signal media 26 are optical conductors to obtain the highest data transmission speed. Digitally encoded telecommunications data is transmitted over these media in various data formats.

In operation, data transmission media carrying dedicated telecommunications channels are coupled to network interface islands 11, 12, 15, and 17 and master network interface island 13. For example, each network interface island 11, 12, 15, and 17 and master network interface island 13 may comprise 1,024 incoming local telecommunications data channels and 1,024 outgoing local telecommunications data channels. Each network interface island 11, 12, 15, and 17 and master network interface island 13 can connect any of the 1,024 incoming local telecommunications data channels to any of the 1,024 outgoing local telecommunications data channels through distributed services nodes 18. These telecommunications data channels may be conducted through a single data transmission medium, such as a fiber optic cable, or through multiple data transmission media, such as individual copper conductors.

The connections between network interface islands 11, 12, 15, 17, and master network interface island 13 are formed through distributed services nodes 18. For example, data and timing media 24 may each conduct 1,024 telecommunications data channels between network interface islands 11, 12, 15, 17, and master network interface island 13 through distributed services nodes 18. These telecommunications data channels carry telecommunications data from network interface islands 11, 12, 15, and 17 and master network interface island 13 to distributed services nodes 18, and also carry telecommunications data from distributed services nodes 18 to network interface islands 11, 12, 15, and 17 and master network interface islands 13.

To further illustrate, a telecommunications data channel may need to be established between an input port of network interface island 11 and an output port of network interface island 15. The present invention allows that telecommunications data channel to be established from network interface island 11, through distributed services nodes 18, and to network interface island 15.

In order to transfer digitally-encoded telecommunications data between network interface islands 11 and 15 and distributed services nodes 18, the timing of each distributed system must be traceable to a single common frequency reference. The common frequency reference for each network interface island 11, 12, 15, and 17, master network interface island 13, and distributed services nodes 18 is provided by synchronization subsystem 16. Master network interface island 13 is characterized by being directly coupled to synchronization subsystem 16. All other network interface islands are coupled to synchronization subsystem 16 through master network interface island 13.

The routing of telecommunications traffic is coordinated by administration subsystem 14. Thus, if telecommunications traffic must be routed from an input port of a first network interface island 11 to an output port of a second network interface island 15, routing signals received by administration subsystem 14 are first converted to control signals that may include switching commands. Next, these control signals are transmitted over control system communications media 22 from administration subsystem 14 to network interface islands 11 and 15 involved in the data transmission path, and to distributed services nodes 18.

In response to these control signals, network interface islands 11 and 15 and distributed services nodes 18 that form the data transmission channel path from the input port of the first network interface island 11 to the output port of the second network interface island 15 are switched to carry the telecommunications data channel. Switching is synchronized by synchronization subsystem 16 via timing signals transmitted over timing signal media 26 and data and timing media 24.

One of ordinary skill in the art will recognize that various changes, substitutions, and alterations can be made to distributed digital cross-connect system 10 without departing from the spirit or scope of the present invention. For example, many suitable numbers of network interface islands may be used, and that the present invention is not limited to the four network interface islands and one master network interface island shown in FIG. 1. Likewise, many suitable data communications media may be used to transmit telecommunications data and administration and control data between each of the network interface islands, the master access island, and the distributed services nodes.

Figure 2:
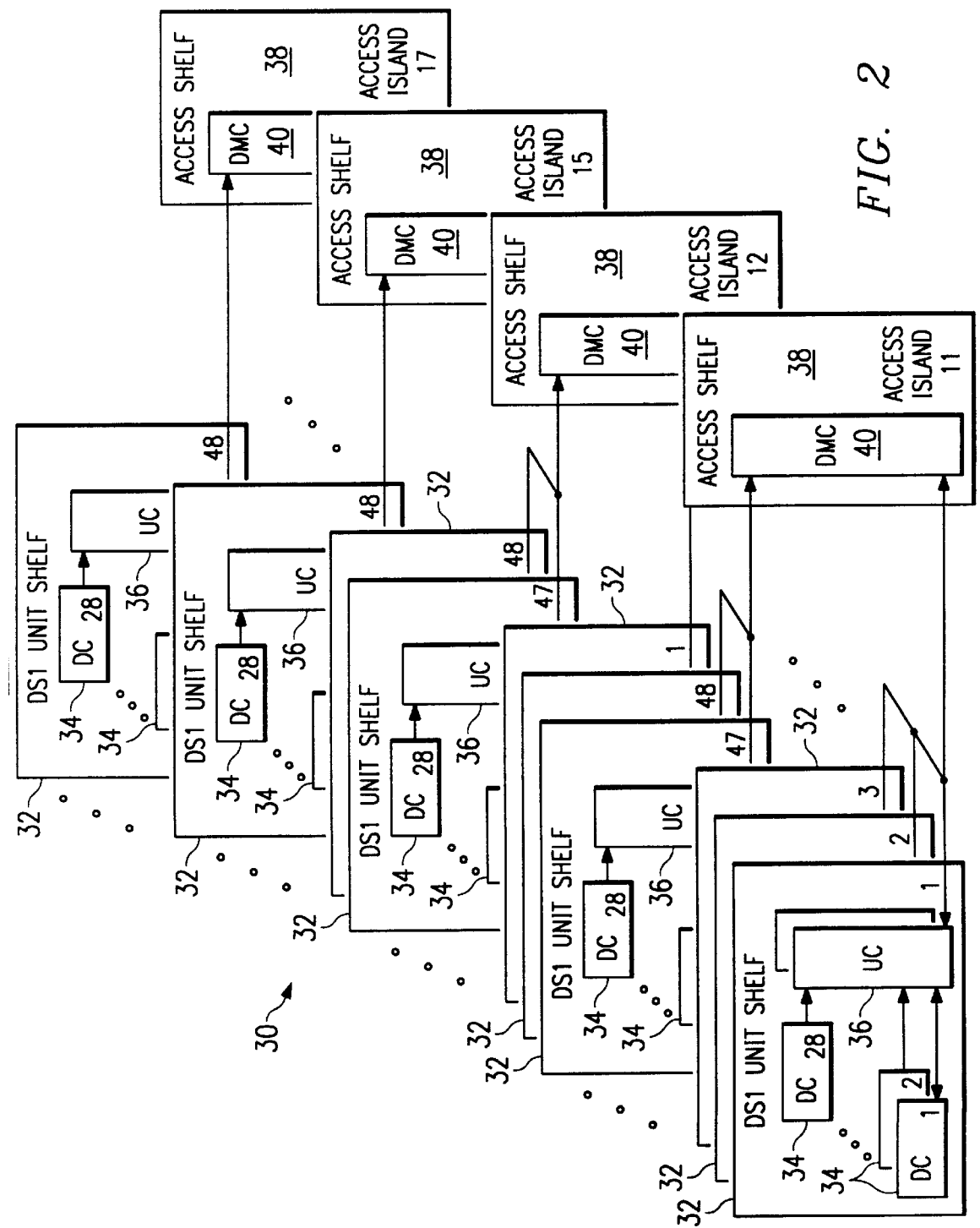
FIG. 2 is a block diagram of an exemplary unit shelf control configuration showing the internal configuration of the network interface island components that control the connection of the network interface island to the master interface island and the distributed services nodes.

FIG. 2 is a block diagram of an exemplary unit shelf control configuration 30 showing the internal configuration of the network interface island components that control the connection of the network interface ports of network interface islands 11, 12, 15, and 17 and of master network interface island 13 to distributed services nodes 18 (FIG. 1). These connections are formed from digroup circuits (DC) 34 to unit controllers (UC) 36, which are contained within network interface islands 11, 12, 15, and 17 and master network interface island 13, and are controlled by digital matrix controllers (DMCs) 40 of access shelves 38. Unit shelf control configuration 30 as shown includes the access shelves for network interface islands 11, 12, 15, and 17.

Unit shelf control configuration 30 for each network interface island contains 48 DS1 unit shelves 32 and two redundant digital matrix controllers 40. DS1 unit shelf 32 may be a discrete telecommunications system component that includes a number of digroup circuits 34 and unit controllers 36. For example, DS1 unit shelf 32 may be a printed circuit board card that includes discrete circuit components. DS1 unit shelf 32 is comprised of, for example, 28 individual digroup circuits 34 and two redundant unit controllers 36. Alternately, DS1 unit shelf 32 may be comprised of more than one discrete telecommunications system component, such as two printed circuit boards and a parallel data communications media connector, and many suitable numbers of digroup circuits 34 and unit controllers 36.

Forty-eight DS1 unit shelves 32 couple to digital matrix controller 40 of access shelf 38. Each DS1 unit shelf 32 receives a number of serial telecommunications data streams at a first frequency at digroup circuits 34 from a network interface island. These serial data streams are converted into a parallel data stream at a second frequency by unit controller 36. Control data received from digital matrix controller 40 is embedded into the parallel data streams.

Digroup circuit 34 may be a discrete telecommunications switch component, such as an integrated circuit within a single integrated circuit package, that receives a single digitally encoded serial data stream or channel from an external telecommunications data transmission medium. Alternately, digroup circuit 34 may be comprised of more than one discrete circuit component, or may be included in a single discrete network interface island component with one or more other digroup circuits 34. For example, digroup circuit 34 may include two or more integrated circuit packages, discrete components, and associated conductors.

Unit controller 36 in DS1 unit shelf 32 may be a discrete telecommunications component, such as a printed circuit card, a separately-packaged integrated circuit, or similar discrete component. Alternately, unit controller 36 may be comprised of one or more discrete telecommunications components. Unit controller 36 receives a plurality of discrete serial telecommunications data channels carrying digitally encoded serial data in a first data format at a first frequency, converts the first data format to a second data format at a second frequency, and includes control data received from digital matrix controller 40 into the second data format.

For example, digroup circuit 34 may receive a first serial data format of 8 bit words at a rate of 1.536 megabits per second, and may convert this data to a second data format of 21-bit words at a rate of 4.032 megabits per second. Control data received from digital matrix controller 40 is included in the additional 13 bits of data in each word by unit controller 36. Unit controller 36 may also convert the second data format of serial data into a third data format of parallel data. For example, unit controller 36 may convert the 21-bit words of serial data from the 28 digroup circuits 34 into 16-bit words of parallel data. This parallel data is transmitted to access shelf 38 at a rate of 5.376 million words per second for subsequent transmission to distributed services nodes 18.

In addition to digital matrix controller 40, access shelf 38 may include alarm units, power supplies, and other suitable components. Digital matrix controller 40 receives switching and control data from administration system 14 via control system communications media 22 and digroup circuit 34 inserts this switching and control data into the data stream being transmitted from digroup circuit 34 to unit controller 36.

Figure 3:
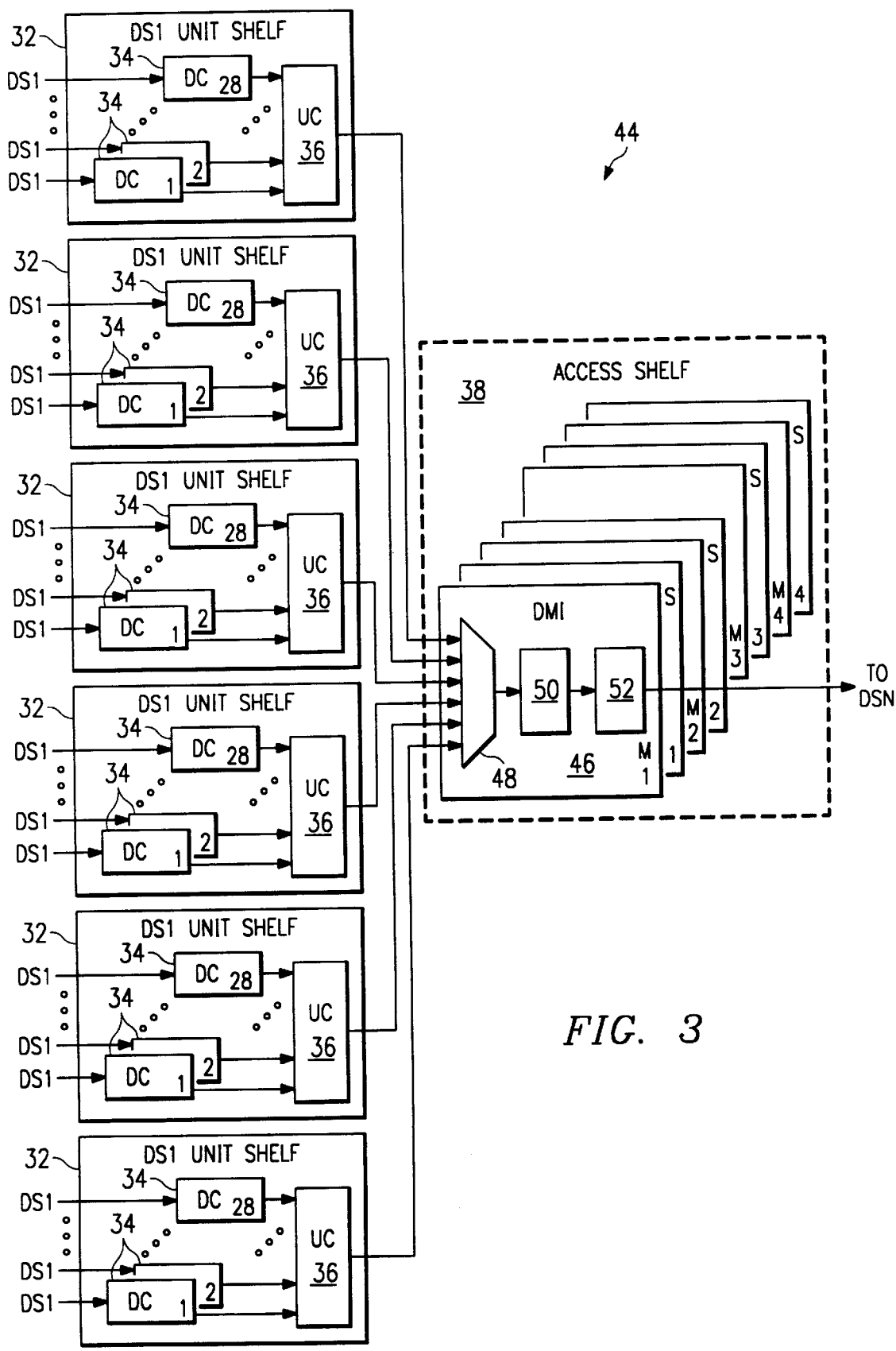
FIG. 3 is an exemplary schematic diagram embodying concepts of the present invention and showing the data transmission path from digroup circuits of the network interface island to the unit controller and to the digital matrix interface.

FIG. 3 is an exemplary schematic diagram 44 embodying concepts of the present invention and showing the data transmission path from digroup circuits 34 to unit controllers 36 and to a digital matrix interface 46. This data transmission path is also contained within access shelves 38 (FIG. 2) of network interface islands 11, 12, 15, and 17 and master network interface island 13 (FIG. 1). Each digroup circuit 34 receives a DS1 serial telecommunications data signal comprised of 8-bit words from an external telecommunications data transmission media. The 28 digroup circuits 34 are coupled to one unit controller 36, which converts the 28 8-bit serial telecommunications data signals into a single 16-bit parallel data signal for transmission to digital matrix interface 46. Eight digital matrix interfaces 46 are contained within one access shelf 38 of FIG. 3.

Digital matrix interface 46 is a telecommunications switching component that receives the 16-bit parallel data signals from unit controllers 36 and multiplexes these signals into a single signal carrying digitally encoded data. Digital matrix interface 46 includes a multiplexer 48 which is coupled to a 16-to-10 bit converter 50. 16-to-10 bit converter 50 is coupled to electrical/optical converter 52. As shown in FIG. 3, six 16-bit parallel data signals from unit controllers 36 are received at multiplexer 48, and are multiplexed into a single 16-bit parallel data signal that is transmitted to 16-to-10 bit converter 50. 16-to-10 bit converter 50 converts the 16-bit parallel data signal received by multiplexer 48 into a 10-bit parallel data signal. This 10-bit parallel data signal and other 10-bit parallel data signals from a slave digital matrix interface 46 is then converted from an electrical to an optical signal by electrical/optical converter 52 and is transmitted to distributed services nodes 18.

After the optical data signal is received at distributed services nodes 18, it is separated into individual data channels corresponding to the original DS0 or DS1 data signals in a process that is partially the reverse of the process shown in FIG. 3. The optical data signal is first converted back to two 10-bit parallel electrical data signals by an optical to electrical converter (not explicitly shown). The 10-bit parallel data signals (32,256 10-bit parallel data signals) for the eight digital matrix interfaces 46 for each access shelf 38 are then switched through the switching matrix of the distributed services nodes 18, in addition to the 10-bit parallel data signals received from other network interface islands 11, 12, 13, 15, and 17. In the preferred embodiment, up to 5,376 DS1 signals (129,024 DS0 signals) can be switched by the switching matrix of each distributed services node 18, although any suitable number of matrix input ports and output ports may be used.

At the output port side of the switching matrix in distributed services nodes 18, two 10-bit parallel data signals are converted to an optical signal for transmission to network interface islands 11, 12, 13, 15, and 17. The optical signal is then converted back into serial DS1 data streams, which subsequently transmitted over external data transmission media.

One of ordinary skill in the art will recognize that various changes, substitutions, and modifications may be made to the system of FIG. 3 without departing from the spirit or scope of the present invention. For example, many suitable numbers of DS1 signals may be converted from serial to parallel data, and the size of parallel data words may be varied from those stated, where suitable for a given purpose. In addition, the step of converting from an electrical signal to an optical signal may be omitted, if electrical signals are transmitted over data and timing media 24. Additional error monitoring and alarm equipment, data processing equipment, and data transmission equipment may be added to the data transmission path where suitable. For example, a data buffer may be used to temporarily store data in the event of a timing error, to increase the reliability of the system.

Figure 4:
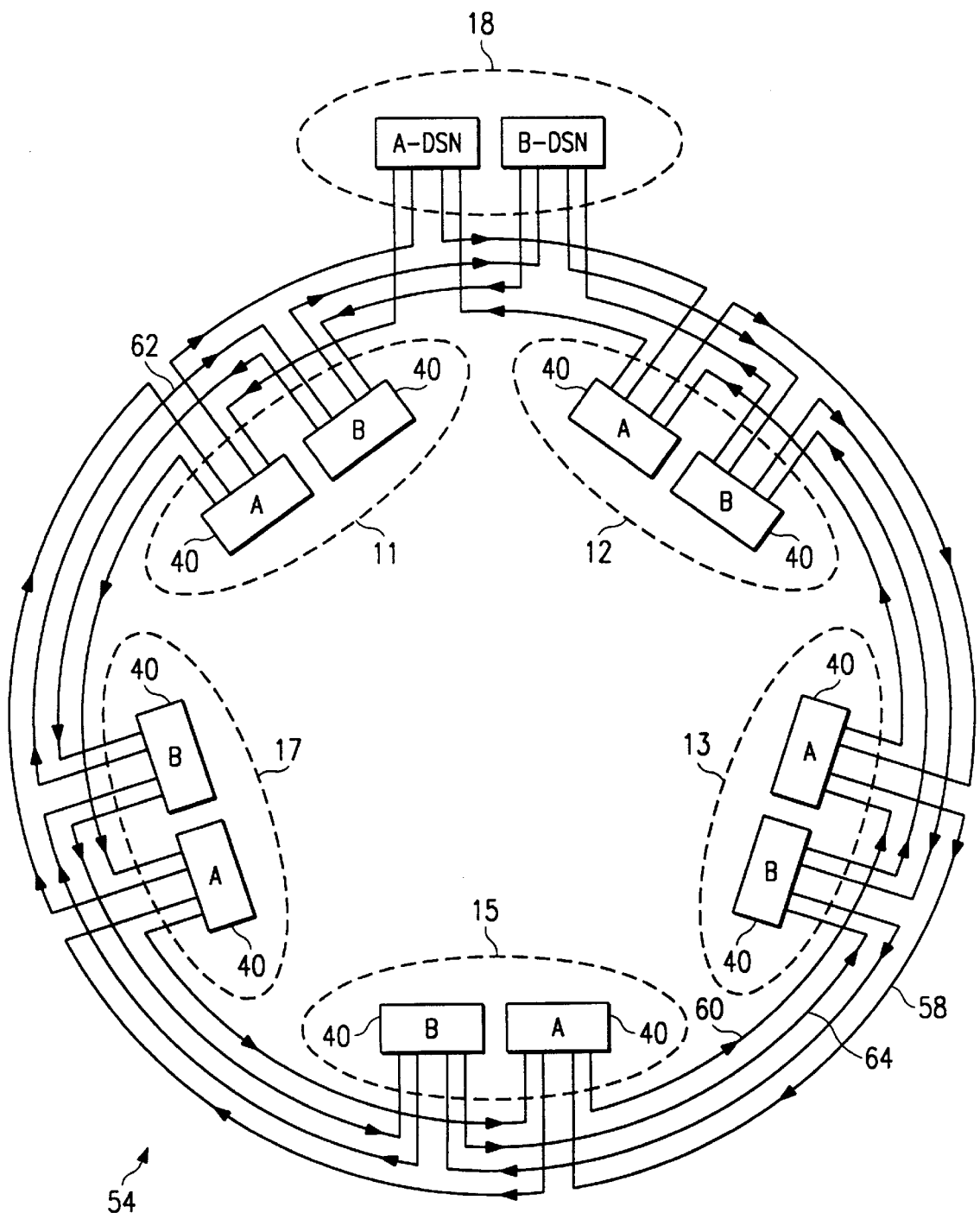
FIG. 4 is an exemplary block diagram of the counter-rotating ring interfaces that are used to receive switching and control data from the control system communications media at each network interface island and to transmit switching and controls data to the control system communications media from the master network interface island.

FIG. 4 is an exemplary block diagram 54 of the counter-rotating ring interfaces that are used to receive switching and control data from control system communications media 22 at each network interface island 11, 12, 15, and 17, and to transmit switching and controls data to control system communications media 22 from master network interface island 13. Block diagram 54 includes redundant "A" and "B" plane digital matrix controllers 40 for each network interface island 11, 12, 15, and 17 and master network interface island 13 that are coupled to clockwise ring "A" 58, counter clockwise ring "A" 60, clockwise ring "B" 62, and counter clockwise ring "B" 64, which comprise control system communications media 22. Distributed services nodes 18 are also coupled to clockwise ring "A" 58, counter clockwise ring "A" 60, clockwise ring "B" 62, and counter clockwise ring "B" 64.

Digital matrix controller 40 receives control and switching commands from clockwise ring "A" 58, counter clockwise ring "A" 60, clockwise ring "B" 62, and counter clockwise ring "B" 64 at the counter-rotating ring interface shown in block diagram 54. Each network interface island 11, 12, 15, and 17 and master network interface island 13 contains a digital matrix controller 40, and a corresponding counter-rotating ring interface. In addition, connections between administration subsystem 14 and clockwise ring "A" 58, counter clockwise ring "A" 60, clockwise ring "B" 62, and counter clockwise ring "B" 64 are made through the digital matrix controller 40 of master network interface island 13. As previously noted, each network interface island of network interface islands 11, 12, 15, and 17 and master network interface island 13 contains parallel planes of redundant components. In this regard, the "A" rings couple to the "A" plane of each network interface island, and the "B" rings couple to the "B" plane of each network interface island.

In operation, control and switching commands determined by administration subsystem 14 are transmitted on the counter-rotating ring interface of master network interface island 13 to clockwise ring "A" 58, counter clockwise ring "A" 60, clockwise ring "B" 62, and counter clockwise ring "B" 64. Control and switching commands are then transmitted to each network interface island 11, 12, 15, and 17 through the counter-rotating ring interface of each network interface island. It should be noted that control and switching commands for each parallel plane of the network interface island of network interface islands 11, 12, 15, and 17 are transmitted over two redundant paths.

For example, for plane A of network interface islands 11, 12, 15, and 17, master network interface island 13, and distributed services nodes 18, switching and control commands are transmitted over clockwise ring "A" 58 and counter clockwise ring "A" 60. Likewise, for plane B of network interface islands 11, 12, 15, and 17, master network interface island 13, and distributed services nodes 18, switching and control commands are transmitted over clockwise ring "B" 62 and counter clockwise ring "B" 64. This configuration ensures that a path between each network interface island 11, 12, 15, and 17 will be available following a construction accident or similar break at one point along clockwise ring "A" 58, counter clockwise ring "A" 60, clockwise ring "B" 62 or counter clockwise ring "B" 64.

One of ordinary skill in the art will recognize that various changes, substitutions, and alterations can be made to the counter-rotating ring interface shown in FIG. 4 without departing from the spirit or scope of the present invention. For example, a single set of counter-rotating rings may be utilized, or the master network interface island may couple directly to the counter-rotating rings, if suitable.

Figure 5:
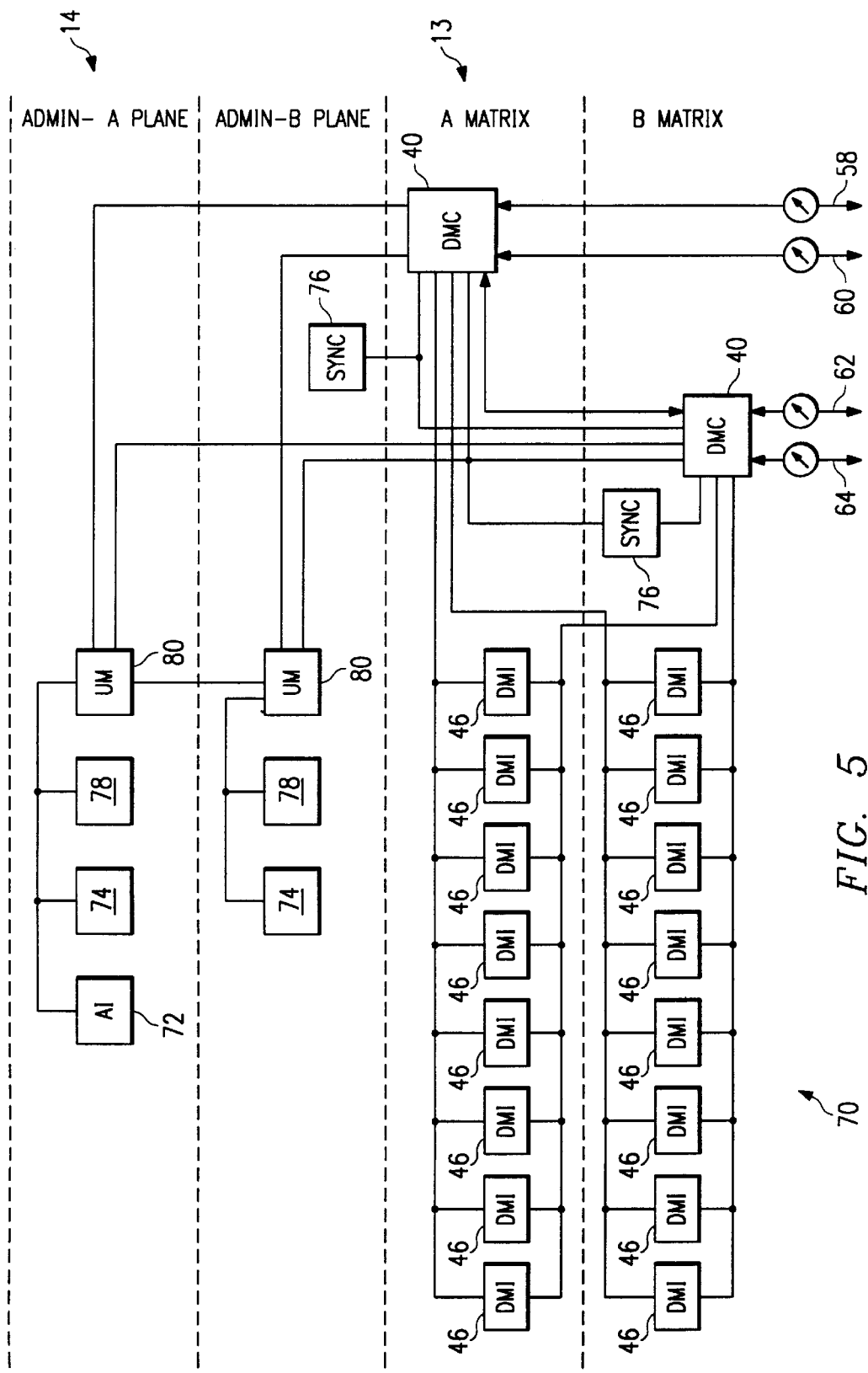
FIG. 5 is an exemplary schematic diagram showing the redundant planes of the control structure of the administration subsystem and the master network interface island.

FIG. 5 is an exemplary schematic diagram showing the redundant planes of control structure 70 of administration subsystem 14 and master network interface island 13. Control structure 70 includes digital matrix controllers (DMC) 40 for the A plane and B plane of the master network interface island 13, which are coupled to the digital matrix interfaces (DMI) 46 of master network interface island 13. The digital matrix controllers 40 are also connected to clockwise ring "A" 58, counter clockwise ring "A" 60, clockwise ring "B" 62 or counter clockwise ring "B" 64, to form the counter-rotating ring interface for master network interface island 13. Plane "A" of control D structure 70 couples to a single alarm interface (AI) 72. Both planes couple to a memory storage unit 74. Synchronization circuit cards (SYNC) 76 are coupled to digital matrix controllers 40.

Alarm interface 72 is a telecommunications system administration system component that is coupled to microprocessor 78 and unit manager 80 of the "A" plane. Alarm interface 72 receives alarm notifications from microprocessor 78 or unit manager 80 that may be derived from overhead switching and control data, and transmits these alarm notifications to an alarm monitor (not explicitly shown) or other suitable component to notify operators of equipment failure, power supply failures, or other malfunctions.

Memory storage 74 is a digital data memory storage device for storing control and switch configuration information. For example, memory storage unit 74 may contain data that describes the current configuration of each network interface island 11, 12, 15, and 17 and master network interface island 13. Memory storage unit 74 may be a magnetic diskette or tape data storage device, a random access memory (RAM), an optical digital data storage device, or other suitable digital data memory devices.

Synchronization circuit card 76 receives timing signals from external timing sources, processes these timing signals, and transmits timing signal status related information to the digital matrix controller 40. The timing signals received and processed by synchronization circuit card are transmitted to the timing system of distributed services nodes 18 and the timing systems of network interface islands 11, 12, 15, and 17 and master network interface island 13. These transmitted timing signals are used to coordinate the transmission of pulse code modulated data between the distributed service nodes 18 network interface islands 11, 12, 13, 15, and 17.

In operation, telecommunications routing commands are received at microprocessor 78 from an external source (not explicitly shown). These telecommunications routing commands are processed by microprocessor 78, which uses data stored in memory storage 74 that includes the current digital cross-connect system matrix configuration for distributed services nodes 18 and the network connections for each network interface island 11, 12, 15, and 17 and master network interface island 13 to determine the matrix connections that are necessary to form the telecommunications data transmission path required by the telecommunications routing commands. This telecommunications data transmission path may include connections between network interface islands 11, 12, 15, and 17 and master network interface island 13 through distributed services nodes 18.

Microprocessor 78 then transmits this matrix connection data to unit manager 80, which converts the data to switching component commands and addresses. These switching component commands and addresses are then transmitted to digital matrix controllers 40, which process the commands for network interface islands 11, 12, 15, and 17 and master network interface island 13. Command status (is then returned to microprocessor 78.

If the processed commands are addressed to the digital matrix interfaces 46 of master network interface island 13, digital matrix controllers 40 of master network interface island 13 route the processed commands to the appropriate digital matrix interfaces 46. Otherwise, the processed commands are transmitted from digital matrix controllers 40 of master network interface island 13 to the digital matrix controllers 40 of network interface islands 11, 12, 15, and 17 via clockwise ring "A" 58, counter clockwise ring "A" 60, clockwise ring "B" 62 and counter clockwise ring "B" 64.

One of ordinary skill in the art will recognize that various changes, substitutions, and alterations can be made to the administration system shown in FIG. 5 without departing from the spirit or scope of the present invention. For example, administration system 14 may be distributed, such that a redundant administration system 14 is present at each network interface island. Alarm interfaces and other components may be omitted or relocated, if suitable. Likewise, additional data processing equipment and data transmission system components may be added without departing from the spirit and scope of the present invention.

Figure 6:
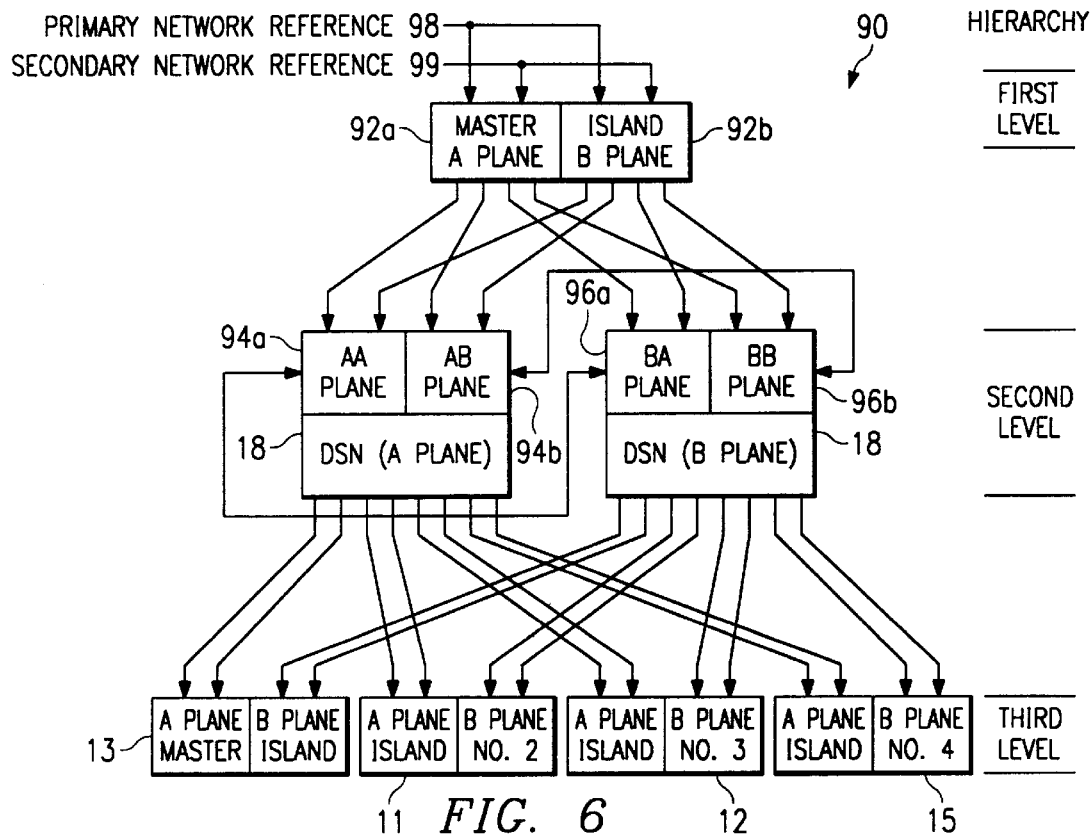
FIG. 6 is an exemplary schematic diagram of a timing hierarchy embodying concepts of the present invention.

FIG. 6 is an exemplary schematic diagram of a timing hierarchy 90 embodying concepts of the present invention. Timing hierarchy 90 includes master timing system 92*a* and redundant master timing system 92*b*, which are coupled to main timing systems 94*a* and 96*a*, and backup timing system 94*b* and 96*b* of distributed services nodes 18. Primary network reference 98 and secondary network reference 99 couple to master timing island 92. The distributed services nodes timing systems are coupled to the timing systems of the redundant planes of network interface islands 11, 12, and 15 and master network interface island 13.

In operation, timing signals derived from primary network reference 98 and secondary network reference 99 are received by a synchronization card (not explicitly shown) of master timing systems 92*a* and 92*b*. These network reference timing signals are used to generate a reference signal for master timing systems 92*a* and 92*b* that is in synchronization with the network reference timing signals. The reference timing signals from master network interface island timing systems 92*a* and 92*b* are then transmitted to the distributed services nodes main timing systems 94*a* and 96*a*, and distributed services nodes backup timing systems 94*b* and 96*b*.

The distributed services nodes main and backup timing systems of both planes generate reference timing signals that are in synchronization with and in phase with the timing reference signal received from the master network interface island timing systems 92*a* or 92*b*. The distributed services nodes timing reference signals are also exchanged between the redundant planes. If there is a conflict between any of these timing signals, an alarm signal may be generated, and the erroneous timing signal may be isolated and ignored. The distributed services node timing signals are then embedded in data frames transmitted from distributed services nodes 18 to network interface islands 11, 12, and 15 and master network interface island 13. Local timing reference signals are generated at each network interface island 11, 12, and 15 and at master network interface island 13, and are synchronized and phase-aligned to one of the timing signals embedded in the transmitted data frames.

One of ordinary skill in the art will recognize that various changes, substitutions, and alterations can be made to the timing hierarchy shown in FIG. 6 without departing from the spirit or scope of the present invention. For example, timing signals may be transmitted directly from the master network interface island to all network interface islands, if suitable.

Figure 7:
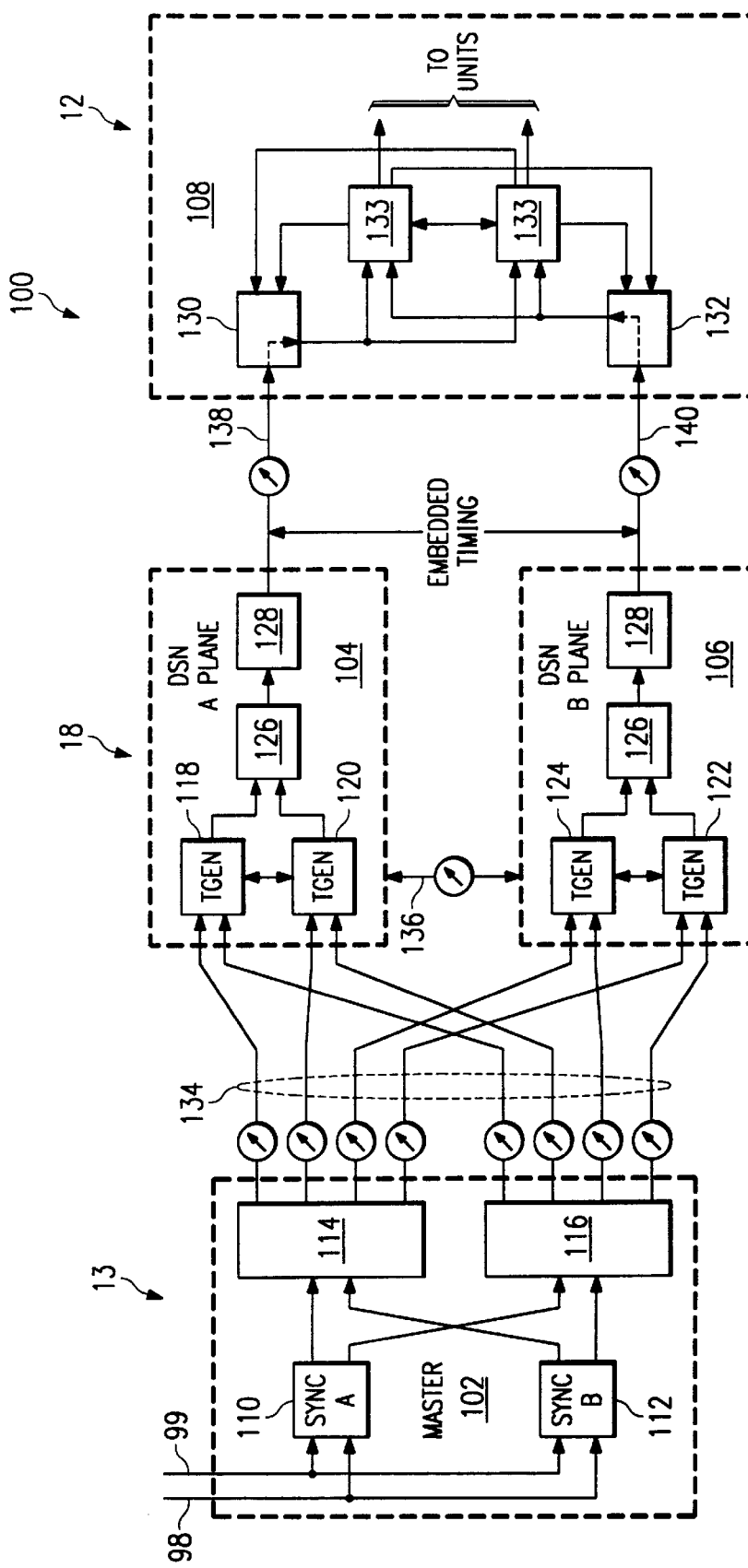
FIG. 7 is an exemplary schematic diagram of a timing distribution system embodying concepts of the present invention.

FIG. 7 is an exemplary schematic diagram of a timing distribution system 100 embodying concepts of the present invention. Timing distribution system 100 includes a master timing system 102, which is coupled to distributed services node timing systems 104 and 106, which couple to an exemplary network interface island timing system 108 that is contained within an network interface island, such as network interface island 11, 12, 15, or 17, or master network interface island 13.

Master timing system 102 performs functions similar to synchronization subsystem 16 of FIG. 1. Master timing system 102 includes independent timing generators (SYNC) 110 and 112, which are coupled to optical synchronization distributors 114 and 116. Independent timing generators 110 and 112 are also coupled to network timing references 98 and 99, which transmit timing reference signals present on the telecommunications network.

Distributed services nodes timing systems 104 and 106 are two redundant planes of components that perform timing functions for distributed services nodes 18. As previously mentioned, distributed services nodes 18 and other components of distributed digital cross-connect system 10 comprise two redundant planes of components, such that distributed digital cross-connect system 10 may remain operable after the failure of one or more components. Distributed services nodes timing systems 104 and 106 include primary timing generators (TGEN) 118 and 122, respectively, and backup timing generators (TGEN) 120 and 124, respectively. Each primary timing generator 118 and 122 and backup timing generator 120 and 124 are coupled to optical synchronization distributors 114 and 116, respectively, via optical conductors 134. Primary timing generator 118 and 122 and backup timing generator 120 and 124 are also coupled to phase locked loops 126, which couple to electrical to optical converters 128.

Electrical to optical converters 128 of distributed services nodes timing systems 104 and 106 may be coupled to digital matrix interfaces 130 and 132 of exemplary network interface island timing system 108 by optical conductors 138 and 140. Digital matrix interfaces 130 and 132 of exemplary network interface island timing system 108 couple to timing generators 133, which cross-connect to each other.

Primary timing generators 118 and 122 of distributed services nodes timing systems 104 and 106 are used to provide a reference timing signal for transmission to exemplary network interface island timing system 108. Backup timing generators 120 and 124 are used only in the event of failure of primary timing generators 118 and 122, but may alternately be used in other situations where suitable. The distributed services node reference timing signal is embedded into the data as it is transmitted to exemplary network interface island timing system 108 from distributed services nodes timing systems 104 and 106.

Exemplary network interface island timing system 108 includes digital matrix interfaces 130 and 132 and timing generators 133, which are coupled to electrical to optical converters 128. Digital matrix interfaces 130 and 132 extract the timing reference signal embedded in the data frame by distributed services nodes timing systems 104 and 106, and provide the extracted timing signal to the timing generators 133.

In operation, network timing references are received at independent timing generators 110 and 112 of master timing system 102. Independent timing generators 110 and 112 generate a timing signal that may be synchronized and in phase with network timing references 98 and 99. Independent timing generators 110 and 112 transmit the timing signal to optical synchronization distributors 114 and 116, which in turn transmit the timing signal via optical conductors 134 to primary timing generators 118 and 122 and backup timing generators 120 and 124 of distributed services nodes timing systems 104 and 106, respectively. This connection path is used to transmit the reference timing signal of master timing system 102 to distributed services nodes timing systems 104 and 106.

The reference timing signal is then transmitted to network interface island timing system 108 by embedding a timing signal in the data that is transmitted from distributed services nodes 18 to network interface islands 11, 12, 15, and 17 and master network interface island 13.

Timing generators 118, 120, 122, and 124 are high accuracy timing generators operating at either 64.512 MHZ or 32.256 MHZ. Timing generators 118, 120, 122, and 124 are operable to receive a network reference clock signal of 64.512 MHZ and to generate local reference clock signals of 32.256 MHZ and 8.064 MHZ. In addition, timing generators 118, 120, 122, and 124 are operable to perform other conventional functions, such as activity testing of reference signals, extraction of timing signals from a data stream, buffering timing signals, and synchronizing a local timing signal with a reference timing signal.

One of ordinary skill in the art will recognize that various changes, substitutions, and alterations can be made to timing distribution system 100 without departing from the spirit and scope of the present invention. For example, electrical conductors may be utilized instead of optical conductors and backup timing generators may be omitted, where suitable.

Figure 8B:
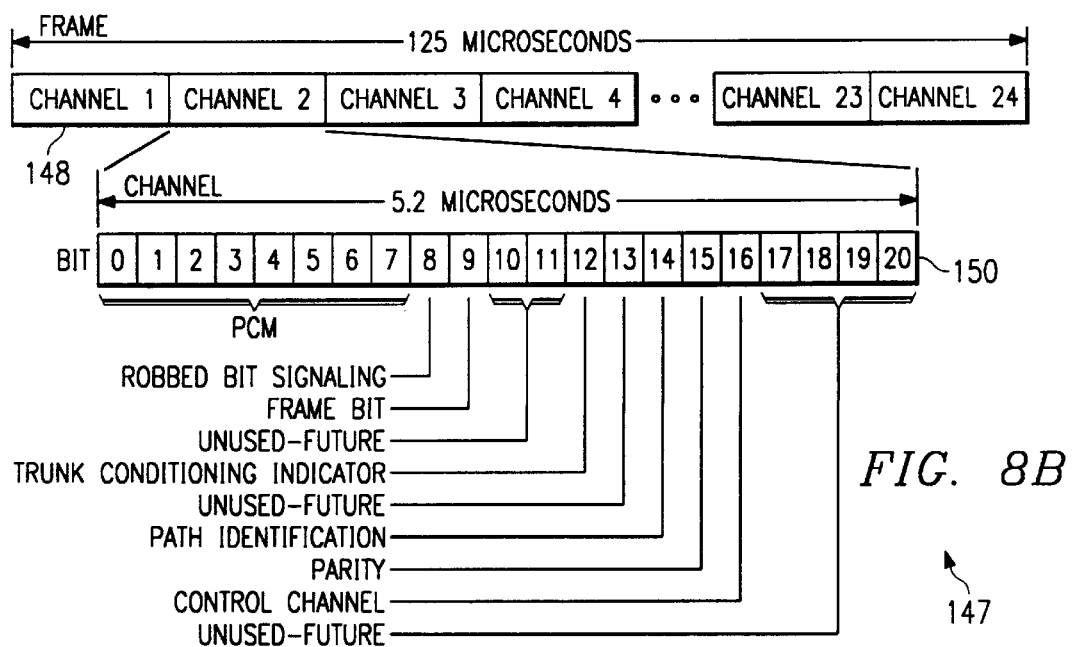
Figure 8A:
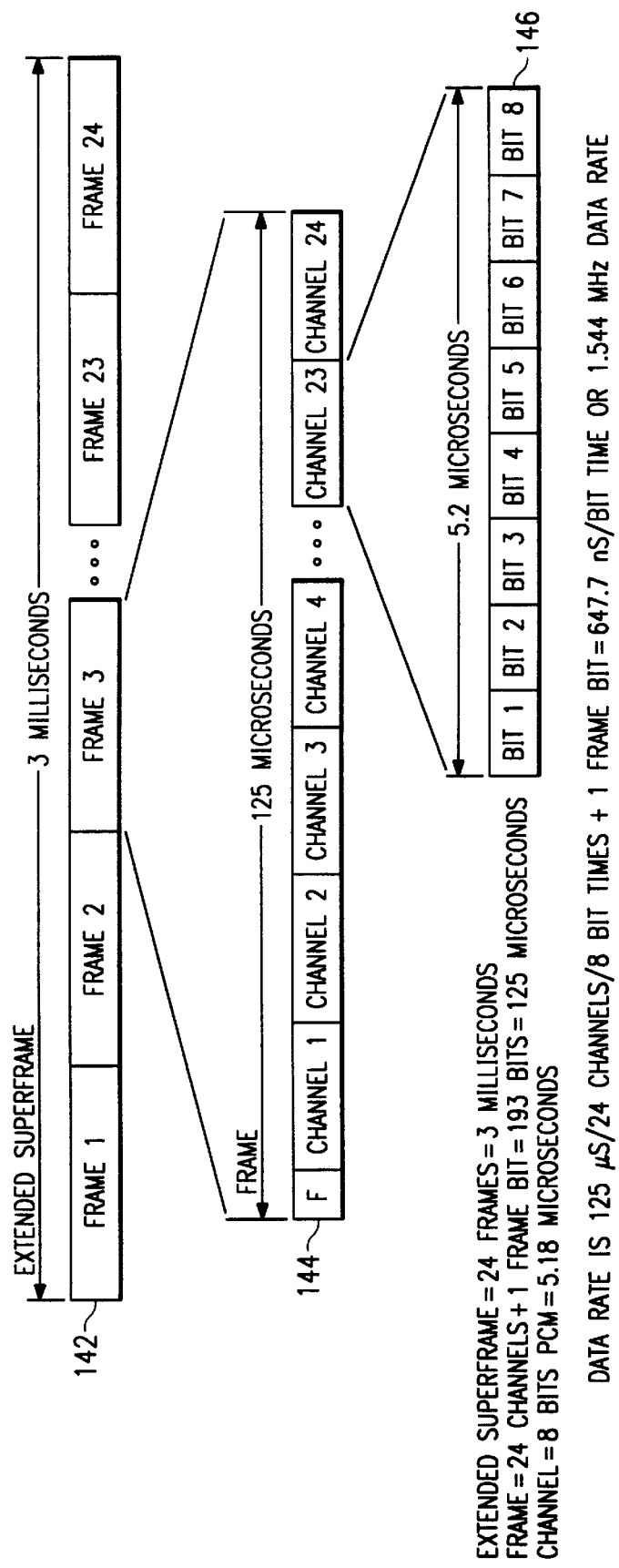
Figure 8C:
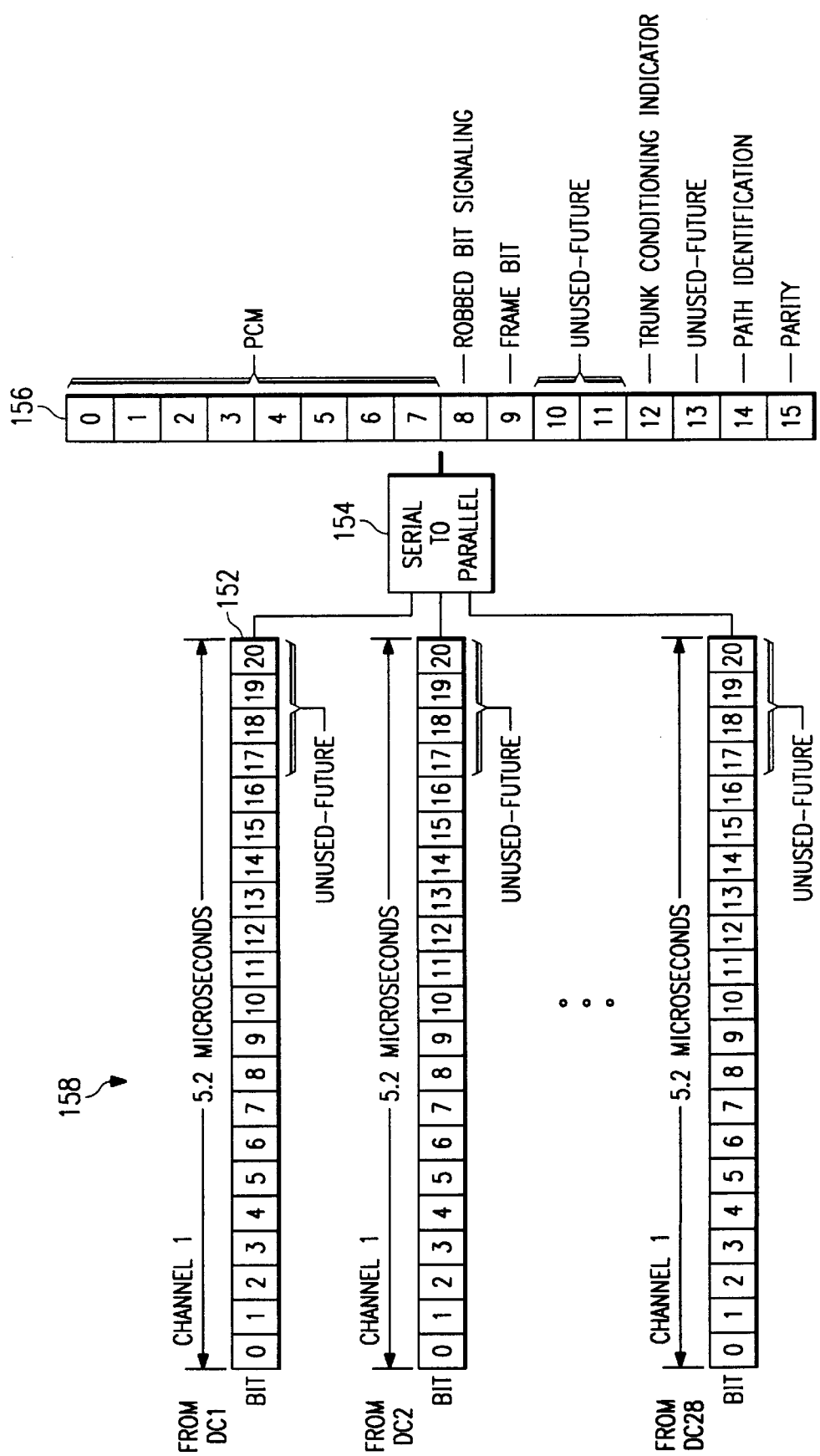

FIGS. 8A through 8C are exemplary data formats embodying concepts of the present invention. FIG. 8A shows an exemplary conventional DS1 data format comprising one extended superframe 142, twenty four frames 144, and twenty four channels 146. Each channel 146 comprises eight bits of digitally encoded data. As shown in FIG. 8A, one channel has a transmission time of 5.2 microseconds, which corresponds to a data transmission rate of 1.544 million bits per second.

FIG. 8B shows an exemplary data format 147 embodying concepts of the present invention. Data format 147 includes one extended superframe (not explicitly shown), twenty four frames 148, and twenty four channels 150. Each channel comprises twenty one bits of digitally encoded data and has a transmission time of 5.2 microseconds, which corresponds to a data transmission rate of 4.032 million bits per second. As shown in FIG. 8B, in addition to the original eight bits of digitally encoded data from channel 146 of FIG. 8A, channel 150 of data format 147 includes a robbed bit signaling bit as bit 8, a frame bit as bit 9, a trunk conditioning indicator bit as bit 12, a path identity bit as bit 14, a parity bit as bit 15, and a control channel bit as bit 16. All other unassigned bits may carry random data values, or may be assigned to carry additional data when suitable.

FIG. 8C shows an exemplary data transmission flow chart 158 embodying concepts of the present invention. Data transmission flow chart 158 shows the conversion steps taken to transmit data between a network interface island and a distributed services node. Data transmission flow chart 158 includes twenty eight parallel channels 152 of serial data, serial to parallel converter 154, and parallel data frame 156. The twenty eight parallel channels 152 of serial data are twenty eight channels 150 as shown in FIG. 8B. Serial to parallel converter 154 receives the twenty eight parallel channels 152 and truncates unassigned data bits, as described in regards to FIG. 8B. For example, serial to parallel converter 154 may include data storage devices that store the twenty eight parallel channels 152 of serial data as they are received and subsequently transmit the stored data as parallel data. The remaining sixteen bits of digitally encoded data are transmitted over sixteen parallel conductors in parallel data frame 156.

FIG. 8D shows an exemplary 10-bit parallel data format 159 embodying concepts of the present invention. 10-bit parallel data format 159 includes data from 24 frames of 16-bit parallel data frame 156. In addition to 8 bits of data, parallel data frame 156 includes five bits of control, timing, and signaling data and three bits of unused data. This data is compressed from 16-bit parallel data frame 156 to 10-bit parallel data frame 159 by eliminating redundant data. For example, the trunk conditioning indicator (TCI) may be sent once every six frames, as it is set after at least a one second filter for most errors, and the transmission time of six frames is 750 microseconds. Likewise, channel ID, parity, and other data may be compressed.

In operation, digitally-encoded, serially transmitted data is received at the network interface island in the data format shown in FIG. 8A, which is a conventional DS1 data format. This data includes eight bits of telecommunications data. Data format 147 of the present invention utilizes a higher data transmission rate to increase the amount of data that can be transmitted in one 5.2 microsecond channel. In addition to the eight bits of telecommunications data, channel 150 includes 13 additional bits of data, including robbed bit signaling data, frame bit data, trunk conditioning indicator data, path identification data, parity data, and control channel data. Twenty eight channels 152 of serial data in data format 152 are converted to parallel data format 156. This data is converted to 10 bit format 159 shown in FIG. 8D and is transmitted from an network interface island to the distributed services node. The same format is used to transmit data from the distributed services node to the network interface island.

The data formats shown in FIGS. 8A through 8D may have many suitable number of components. In general, the data format of FIG. 8A may have Q extended superframes of P frames of N channels of M-bit words, and the data format of FIG. 8B may have Z extended superframes of Y frames of X channels of W-bit words, where M bits of the W-bit word are the data from the data format of FIG. 8A, and R bits of the W-bit word are other data, and where M, N, P, Q, R, W, X, Y, and Z are suitable integers that satisfy the above criteria. For example, the sum of M and R cannot be greater than W.

One of ordinary skill in the art will recognize that various changes, substitutions, and alterations can be made to the data format described above without departing from the spirit or scope of the present invention. For example, the unassigned data bits may be omitted, or may be assigned other suitable data values. Likewise, the parallel data transmission format may be modified to include more or less than sixteen bits, as shown in FIG. 8C.

Figure 9:
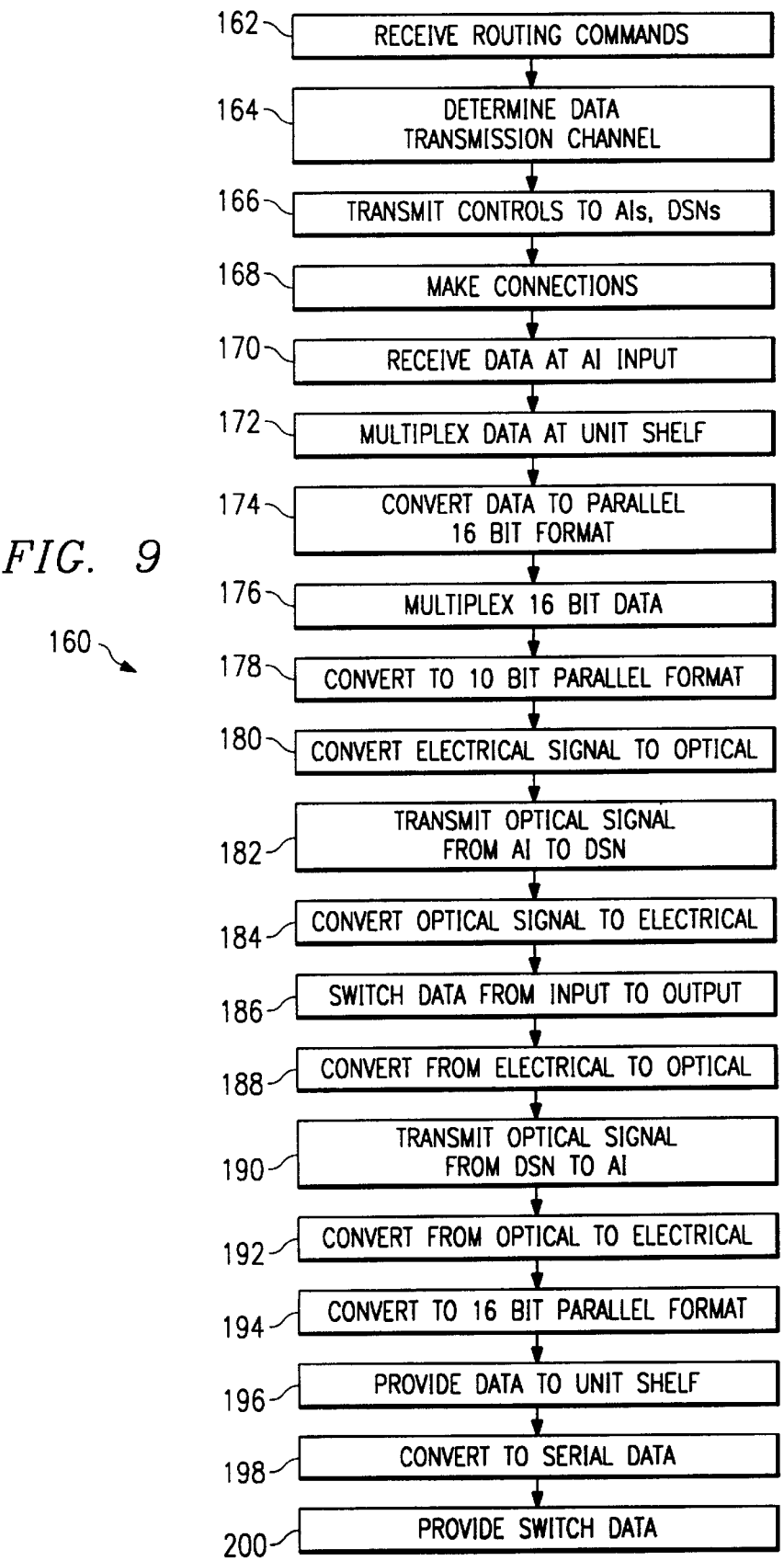
FIG. 9 is a flow chart of an exemplary method for transmission of data from a first network interface island to a second network interface island through a distributed services node.

FIG. 9 is a flow chart 160 of an exemplary method for transmission of data in a distributed digital cross-connect system from a first network interface island to a second network interface island through a distributed services node. The method begins at step 162, where routing commands are received at the administration subsystem 14. These routing commands may include a first network interface island input port and a second network interface island output port, between which a data transmission channel must be established. At step 164, administration subsystem 14 determines, from data that represent the current status of all components of distributed digital cross-connect system 10, a data transmission channel between the network interface islands 11, 12, 13, 15, and 17 and distributed services nodes 18.

Administration subsystem 14 transmits control commands for establishing the data transmission channel at step 166 between the network interface islands 11, 12, 13, 15, and 17 and the distributed services nodes 18. These connections are formed at step 168. At step 170, the serial data that is to be transmitted over the data communications channel is received at the first network interface island input in a standard DS1 format. This serial data is then multiplexed at step 172 to a higher serial data rate at the unit shelf of the network interface island. The high-speed serial data is then converted to a parallel 16-bit data format such as 16-bit parallel data format 156 of FIG. 8C at step 174.

At step 176, the parallel 16-bit data is multiplexed to a second higher speed, and is then converted to a 10-bit parallel format such as 10-bit parallel format 159 of FIG. 8D at step 178. At step 180, the 10-bit parallel data format is converted from an electrical to an optical signal for transmission from the network interface island to the distributed services nodes at step 182.

At step 184, the optical signal is converted to an electrical signal at the distributed services nodes. At step 186, the data is switched through the switching matrix of the distributed services nodes, and is subsequently converted back to an optical signal at step 188. This optical signal is then transmitted from the distributed services nodes to the network interface islands at step 190.

At step 192, the 10-bit parallel optical signal is converted to an electrical signal at the network interface island, and is then converted to a 16-bit parallel signal at step 194. At step 196, overhead data such as control and switching data is provided to the unit shelf, which uses the data to convert the 16-bit parallel signal to a serial signal at step 198. This serial data is then transmitted to the network connection of the appropriate digroup circuit at step 200.

One of ordinary skill in the art will recognize that various changes, substitutions, and alterations can be made to the method described above without departing from the spirit or scope of the present invention. For example, the step of converting from electrical to optical may be omitted, if suitable. Likewise, the steps of multiplexing and demultiplexing data signals may be omitted if suitable.

Figure 10:
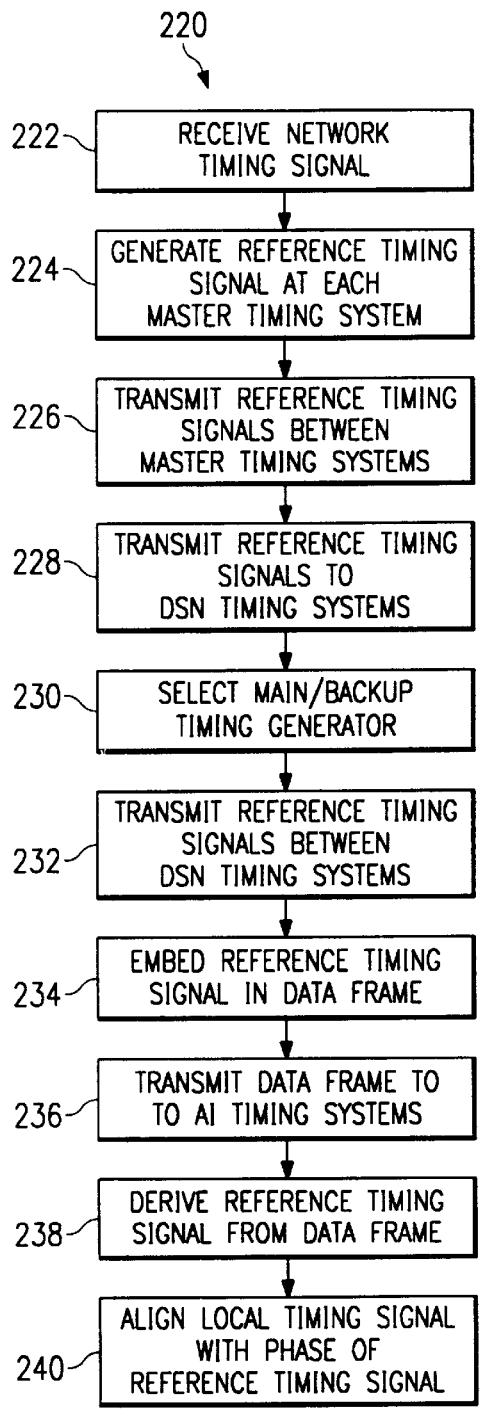
FIG. 10 is an exemplary flow chart of a timing method for a distributed digital cross-connect system.

FIG. 10 is an exemplary flow chart 220 of a timing method for distributed digital cross-connect system 10. The timing method begins at step 222, where a network timing reference signal is received at independent timing generators 110 and 112 of FIG. 7 which comprise redundant master timing systems 102. At step 224, a reference timing signal is generated at each independent timing generator 110 and 112 of master timing systems 102. These master timing system reference timing signals are transmitted between the redundant planes of master timing system 102 at step 226 to optical synchronization distributors 114 and 116. A common reference timing system timing reference signal is then established between the redundant planes of master timing system 102, and is transmitted at step 228 from optical synchronization distributors 114 to primary timing generators 118 and 122 and backup timing generators 120 and 124 of distributed services nodes timing systems 104 and 106, respectively.

At step 230, the primary or backup timing generator is chosen based upon a suitable selection criteria, such as whether primary timing generators 118 and 122 are operable. At step 232, reference timing signals are transmitted between distributed services nodes timing systems 104 and 106 to allow the systems to be synchronized. At step 234, the reference timing signals of distributed services nodes timing systems 104 and 106 are embedded in a data frame that is to be transmitted from the distributed services node 18 to one of network interface islands 11, 12, 13, 15, and 17.

At step 238, network interface island timing system 108 derives a reference timing signal from the embedded timing signal, and also receives a local timing signal from a local oscillator. Network interface island timing system 108 then uses this reference timing signal to align the phase of a locally generated timing signal at step 240. In this manner, the timing of distributed digital cross-connect system 10 may be coordinated such that all components of distributed digital cross-connect system 10 may obtain a synchronized timing reference signal.

One of ordinary skill in the art will recognize that various changes, substitutions, and alterations can be made to the method described above without departing from the spirit or scope of the present invention. For example, the steps of embedding a reference signal in a data frame may be omitted and replaced with steps of transmitting timing signals over a dedicated timing channel.

Figure 11:
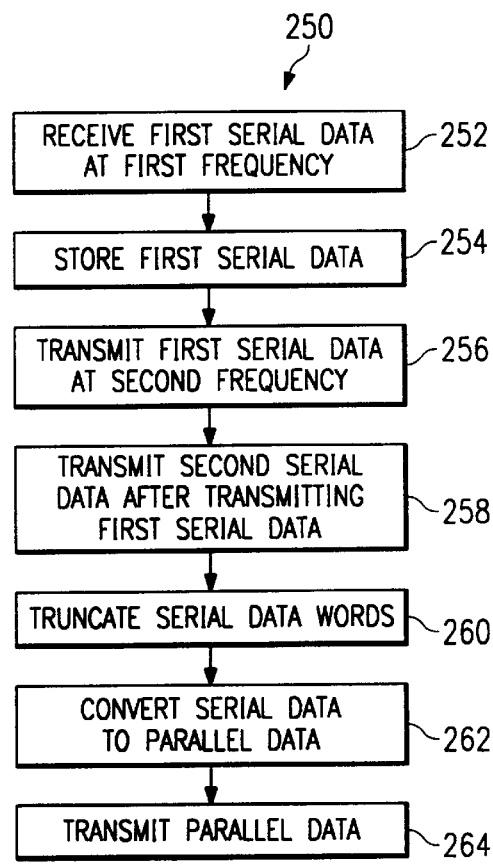
FIG. 11 is an exemplary method for transmitting digitally-encoded data in accordance with the teachings of the present invention.

FIG. 11 is an exemplary method 250 for transmitting digitally-encoded data in accordance with the teachings of the present invention. At step 252, first serial data is received at a first frequency. For example, the first serial data may comprise a standard DS1 channel with 8 bits of digitally-encoded data. This first serial data is stored at step 254, then retrieved and transmitted at a higher frequency at step 256. After the first serial data has been transmitted, second serial data is transmitted at step 258. For example, this first and second serial data may be transmitted in a data format such as channel 150 of FIG. 8B, where the first serial data may be bits 0 through 7 of frame 150, and the second serial data may be bits 8 through 20 of frame 150.

The combined first and second serial data may then be received at a serial to parallel converter, such as serial to parallel converter 154, and the serial data words may then be truncated at step 260. For example, any unassigned bits may be truncated, as shown in FIG. 8C. This truncated serial data may then be stored and converted to parallel data at step 262. The parallel data is then transmitted at step 264, such as between a network interface island of one of network interface islands 11, 12, 13, 15, and 17 and distributed services node 18.

One of ordinary skill in the art will recognize that various changes, substitutions, and alterations can be made to the method described above without departing from the spirit or scope of the present invention. For example, the step of truncating data at step 260 may be omitted if there is no undesignated data in the serial data. Likewise, the step of transmitting in parallel may be omitted, if suitable.

The present invention offers many technical advantages. One important technical advantage of the present invention is that two or more discrete network interface islands may be interconnected in a manner that allows any input port of the interconnected network interface islands to be switched to any output port of the interconnected network interface islands. Another important technical advantage of the present invention is that the number of interconnected network interface islands may be increased or decreased without affecting the input and output port configurations of the network interface islands.

Although the present invention has been described in detail, it should be understood that various changes, substitutions, and alterations can be made hereto without departing from the spirit and scope of the invention as defined by the appended claims.

What is claimed is:

1. A method for connecting two or more network interface islands comprising the steps of:

transmitting timing data to a first network interface island, a second network interface island, and a distributed services node;

transmitting controls data to a first network interface island, a second network interface island, and a distributed services node;

connecting the first network interface island to the second network interface island through the distributed services node;

wherein the step of transmitting controls data comprises the steps of:

receiving a routing request at an administration system for establishing a connection path from a first telecommunications address to a second telecommunications address;

determining a connection path from a first network interface island input port to a second network interface island output port through a first distributed services node that will form the connection path from the first telecommunications address to the second telecommunications address; and transmitting control commands to the first network interface island, the second network interface island, and the distributed services node;

wherein the step of transmitting control commands comprises the steps of:

transmitting control commands to the first network interface island, the second network interface island, and the distributed services node over a first fiber optic conductor, wherein the first fiber optic conductor is coupled to the first network interface island, the second network interface island, and the distributed services node in a first direction relative to each network interface island; and transmitting control commands to the first network interface island, the second network interface island, and the distributed services node over a second fiber optic conductor, wherein the second fiber optic conductor is coupled to the first network interface island, the second network interface island, and the distributed services node in a second direction relative to each network interface island.

2. The method of claim 1 wherein the step of transmitting control commands further comprises the steps of:

transmitting control commands to a first redundant plane of the first network interface island, a first redundant plane of the second network interface island, and a first redundant plane of the distributed services node over a first fiber optic conductor, wherein the first fiber optic conductor is coupled to the first redundant plane of the first network interface island, the first redundant plane of the second network interface island, and the first redundant plane of the distributed services node in a first direction relative to each network interface island;

transmitting control commands to the first redundant plane of the first network interface island, the first redundant plane of the second network interface island, and the first redundant plane of the distributed services node over a second fiber optic conductor, wherein the second fiber optic conductor is coupled to the first redundant plane of the first network interface island, the first redundant plane of the second network interface island, and the first redundant plane of the distributed services node in a second direction relative to each network interface island;

transmitting control commands to a second redundant plane of the first network interface island, a second redundant plane of the second network interface island, and a second redundant plane of the distributed services node over a third fiber optic conductor, wherein the third fiber optic conductor is coupled to the second redundant plane of the first network interface island, the second redundant plane of the second network interface island, and the second redundant plane of the distributed services node in a first direction relative to each network interface island; and transmitting control commands to the second redundant plane of the first network interface island, the second redundant plane of the second network interface island, and the second redundant plane of the distributed services node over a fourth fiber optic conductor, wherein the fourth fiber optic conductor is coupled to the second redundant plane of the first network interface island, the second redundant plane of the second network interface island, and the second redundant plane of the distributed services node in a second direction relative to each network interface island.

* * * * *